(12) United States Patent
Graham et al.

(10) Patent No.: US 10,953,818 B2
(45) Date of Patent: Mar. 23, 2021

(54) MULTI-FUNCTIONING ATTACHABLE VEHICLE APPENDAGES METHODS AND SYSTEMS

(71) Applicants: Patrick Graham, Cheyenne, WY (US); Brandon Graham, Cheyenne, WY (US)

(72) Inventors: Patrick Graham, Cheyenne, WY (US); Brandon Graham, Cheyenne, WY (US)

( * ) Notice: Subject to any disclaimer, the term of this patent is extended or adjusted under 35 U.S.C. 154(b) by 0 days.

(21) Appl. No.: 16/530,785

(22) Filed: Aug. 2, 2019

(65) Prior Publication Data
US 2020/0039449 A1 Feb. 6, 2020

Related U.S. Application Data

(60) Provisional application No. 62/713,846, filed on Aug. 2, 2018.

(51) Int. Cl.
| | |
|---|---|
| B60R 11/06 | (2006.01) |
| B60R 3/00 | (2006.01) |
| B62D 65/16 | (2006.01) |
| B60R 19/02 | (2006.01) |
| B60R 19/42 | (2006.01) |
| B60R 11/00 | (2006.01) |

(52) U.S. Cl.
CPC ............ B60R 11/06 (2013.01); B60R 3/002 (2013.01); B60R 19/023 (2013.01); B60R 19/42 (2013.01); B62D 65/16 (2013.01); B60R 2011/004 (2013.01); B60R 2011/0052 (2013.01)

(58) Field of Classification Search
CPC ............ B60R 11/06; B60R 3/02; B60R 3/002
See application file for complete search history.

(56) References Cited

U.S. PATENT DOCUMENTS

| | | | |
|---|---|---|---|
| 1,488,720 A | 4/1924 | Tichy et al. | |
| 2,161,136 A * | 6/1939 | Conradson | B60S 9/06 254/425 |
| 2,786,710 A * | 3/1957 | Chapman | B60R 3/02 296/162 |
| 3,614,136 A | 10/1971 | Dent | |
| 4,249,685 A * | 2/1981 | Sawby | B60S 11/00 224/402 |
| 4,419,038 A * | 12/1983 | Pendergraft | B60P 1/5495 212/252 |
| 4,696,507 A | 9/1987 | Alldredge | |
| 5,193,829 A | 3/1993 | Holloway et al. | |

(Continued)

OTHER PUBLICATIONS

Winnebago RVs, Era Exterior Features, https://winnebagoind.com/products/class-b/2017/Era/Exterior/Features, Jul. 31, 2018, 2 pages.

(Continued)

*Primary Examiner* — Brian L Swenson
(74) *Attorney, Agent, or Firm* — Santangelo Law Offices, P.C.

(57) ABSTRACT

Embodiments of the present invention may provide a step, rock guard, handyman jack storage and even jack lift point system that can be made for most 4×4 vehicles. One product may resolve individual problems that may become apparent once a lift kit and larger wheels are installed on a 4×4 vehicle. Products can be made to fit two-door Jeeps, four-door Jeeps, Trucks, SUV's, or the like.

19 Claims, 11 Drawing Sheets

(56) References Cited

U.S. PATENT DOCUMENTS

| | | | | |
|---|---|---|---|---|
| 5,894,974 | A * | 4/1999 | Jensen | B60R 9/00 |
| | | | | 224/404 |
| 5,979,953 | A * | 11/1999 | Rinehart | B60R 19/48 |
| | | | | 293/106 |
| 6,270,099 | B1 | 8/2001 | Farkash | |
| 6,382,650 | B1 | 5/2002 | Farkash | |
| 6,406,045 | B1 | 6/2002 | Farkash | |
| 6,550,799 | B2 | 4/2003 | Farkash | |
| 7,004,486 | B1 | 2/2006 | Farkash | |
| 7,562,924 | B2 * | 7/2009 | Schultz | B60R 11/06 |
| | | | | 296/37.1 |
| 9,278,650 | B2 * | 3/2016 | Meszaros | B60R 3/002 |
| 2005/0088005 | A1 * | 4/2005 | Krueger | B60R 5/04 |
| | | | | 296/37.8 |
| 2006/0119134 | A1 * | 6/2006 | Dean | B62D 33/027 |
| | | | | 296/182.1 |
| 2009/0044729 | A1 | 2/2009 | Navarre et al. | |
| 2009/0267374 | A1 | 10/2009 | Mulder | |

OTHER PUBLICATIONS

Storboards, Running Board Storage Systems, https://storboards.com/pictures.html, Jul. 31, 2018, 2 pages.
Storboards FAQs, Running Board Storage Systems, https://storboards.com/productinformation.html, Jul. 31, 2018, 2 pages.
Youtube, Ultimate Truck Gear Rocker Pod Cargo Step, Jul. 31, 2018, 12 pages.
Hi-Lift® Cast/Steel Jack | Hi-Lift® Jack Co., https://hi-lift.com/hi-lift-jacks/cast-steel/, Jul. 30, 2019, 4 pages.
Big Red 48 in. 3 Ton Farm Jack-TR6501B—The Home Depot, https://www.homedepot.com/p/Big-Red-48-in-3-Ton-Farm-Jack-TR6501B/100594525?MERCH=REC-_-pipsem-_-NA-_-100594525-_-N, Jul. 30, 2019, 8 pages.
U.S. Appl. No. 62/713,846, filed Aug. 2, 2018. First Named Inventor: Graham.

* cited by examiner

MULTI-FUNCTIONING ATTACHABLE VEHICLE APPENDAGES METHODS AND SYSTEMS

PRIORITY CLAIM

This application is a U.S. Non-Provisional patent application claiming priority to and the benefit of U.S. Provisional Application No. 62/713,846 filed Aug. 2, 2018, hereby incorporated by reference herein in its entirety.

BACKGROUND OF THE INVENTION

There are millions of 4×4 vehicles on the road today that have been modified with lift kits and larger wheels and tires. Once a truck may be modified there may be reoccurring problems that can arise that a truck owner may need to address. These problems may have been corrected in the past by purchasing many different products. After evaluating the items that needed to be addressed, embodiments of the present invention may provide one product that may correct at least four problems.

A first problem may include a need for a step. Once a vehicle, such as a 4×4 vehicle, truck, or the like, may be lifted, it may be difficult to step up into the vehicle perhaps because of the additional height. Installing a running board or even a step may create easier access into the vehicle. In the past, running boards have been available for consumers to purchase, however, none provide storage that may securely stow a car jack, such as a handyman jack, Hi-Lift jack, or the like.

A second problem may be that the factory tire jack may be insufficient in lifting the vehicle perhaps because of the new height of the vehicle which may force vehicle owners to purchase a larger handyman jack or the like. Additionally, automobile manufacturers may not create suitable jack points on a vehicle that can support the use of the handyman jack or the like perhaps without causing damage to the truck. Many of the wheel flares and bumpers may be plastic on newer vehicles and may be attached with clips that cannot support the weight of the vehicle. Use of the jack directly on the body of a vehicle may usually be enough to damage the vehicle and is not desirable.

Third, there may not be a secure location to store a handyman jack or the like. Space and even safety concerns may prohibit the storage of a larger jack in the passenger compartment perhaps without it being in the way of passengers or even becoming a hazard in an accident. If left in the bed of a truck unsecured, a jack can slide around the bed causing damage and can even be easily stolen. In the past, one may have purchased mounting brackets that may secure the jack to the outside of the vehicle. However, this may leave the jack exposed to weather and may not be desirable to mount to the exterior of the truck.

Another problem may be damage to vehicles. 4×4 enthusiasts may modify their trucks so that they can crawl over rocks and perhaps other large obstacles. Many of the running boards and even rock guards that have been sold in the past may be attached directly to the body of the truck and may not provide protection to the vehicle's body.

BRIEF SUMMARY OF THE INVENTION

The present invention includes a variety of aspects, which may be selected in different combinations based upon the particular application or needs to be addressed. In embodiments, the invention may include methods and systems using multi-functional attachable vehicle appendages which may act as a running board, storage perhaps for a car jack, and even a rock guard. One goal of the present invention may include a step or even running board perhaps with lockable storage to securely hold a handyman jack without movement, which may be protected from weather, and may provide mounts that may be bolted to the frame of a vehicle perhaps allowing for dedicated jack points to use with a jack such as a handyman jack.

Naturally, further objects, goals, and embodiments of the inventions are disclosed throughout other areas of the specification and figures.

DETAILED DESCRIPTION OF THE PREFERRED EMBODIMENTS

As mentioned earlier, the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments are not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention may provide a storage which may also act as a step such as a running board or even a rock guard that may be designed to work on most vehicles such as 4×4 or other vehicles. The design may allow mounting brackets and even storage to be purchased independent of each other and perhaps the end user can choose to have a storage step or perhaps just a step. In embodiments, the present invention may provide systems and methods, which may be called "Hijackpaks," which may address past problems by provide a step such as a running board, lift points for a handy man jack, lockable storage for a handyman jack, and perhaps even rock guards all in one system.

Embodiments of the present invention may provide a method for using a vehicle appendage (1) comprising the steps of mounting at least one bracket (2) to a frame (3) of a vehicle (4), wherein said bracket is located near a door (5) of said vehicle; attaching a car jack storage (6) to said bracket mounted to said vehicle frame, wherein said car jack storage is located under (7) at least part of said door (5) of said vehicle; opening said car jack storage (6); placing a car jack (8) in a conforming compartment (9) of said car jack storage mounted to said vehicle frame; anchoring said car jack in said car jack storage with an attachment (10); storing said car jack in said car jack storage mounted to said vehicle frame; closing said car jack storage; and perhaps even stepping on said closed car jack storage (11) to enter and exit said door of said vehicle. Other embodiments may provide a vehicle appendage (1) comprising at least one bracket (2) capable of being mounted to a frame (3) of a vehicle (4); an openable car jack storage (6) capable of attachment said at least one bracket; a conforming compartment (9) in said openable car jack storage capable of receiving a car jack (8); a jack anchor attachment (10) capable of securing said car jack into said conforming compartment; and perhaps even wherein said openable car jack storage when in a closed position (11) comprises a step (40) for said vehicle.

Figure 1:
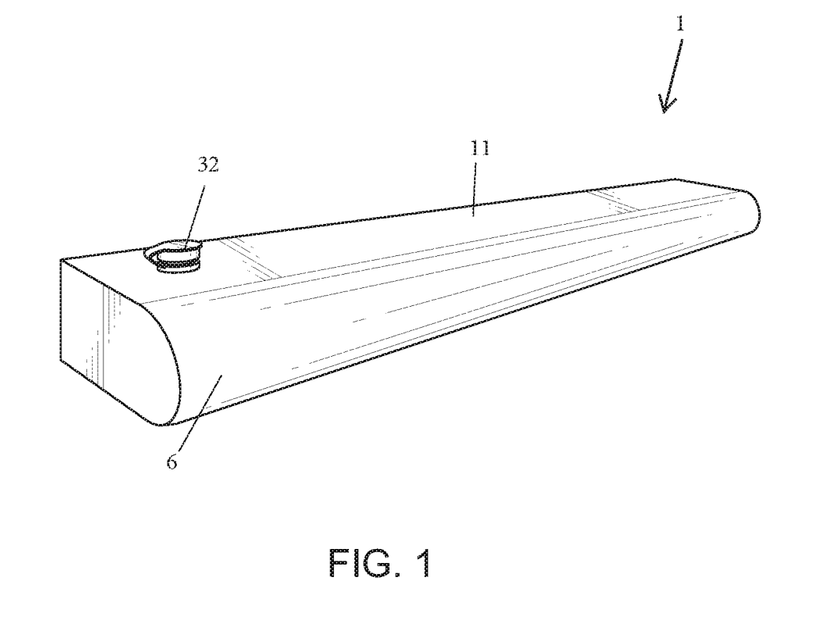
FIG. 1 shows an example of an embodiment of a vehicle appendage such as a car jack storage as may be understood in the various embodiments of the present invention.
Figure 2:
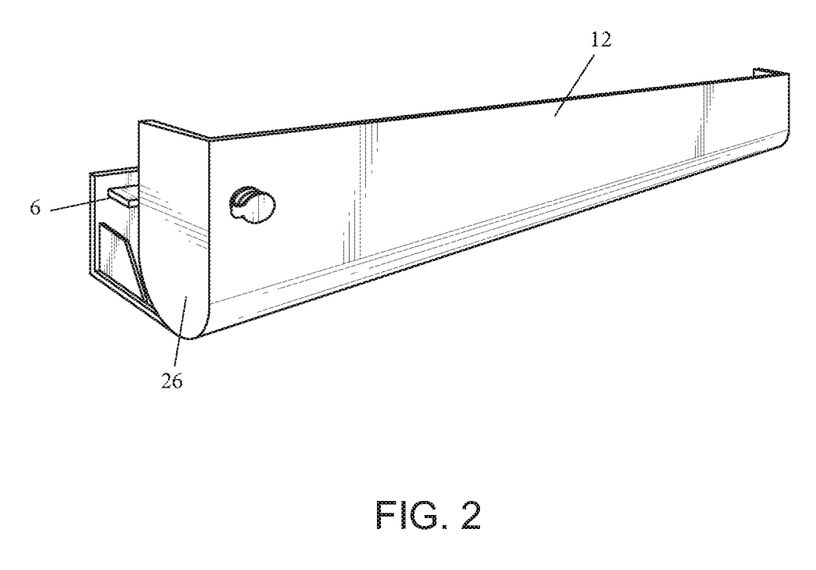
FIG. 2 shows an example of an embodiment of an opened car jack storage as may be understood in the various embodiments of the present invention.

As shown in FIGS. 1 and 2, a vehicle appendage (1) may be a car jack storage (6) which may be attached to a vehicle. A car jack storage may be any kind of storage, container, capsule, or the like which may allow storage of a car jack (8) therein. A storage may be designed with a slim aesthetic look. A car jack storage (6) may be an openable car jack storage so that it may be in an open (12) or closed position (11). A car jack storage may have an opening such as a clam shell door (26) or may have any other type of opening or even a door to access the inside of the storage. A storage may have a hinge system (27) that may be used with a door. A hinge system may include hinges (perhaps about four on each storage) which may be made of 2½" steel and about ¼" pin which may provide smooth opening and closing and even durability. Of course, other sizes, variations, and other materials may be used. In some embodiments, a door may open away from the body of the vehicle or in other embodiments, a door may open in any way. A car jack (8) may be any kind of car jack including but not limited to a handyman jack, a non-factory provided car jack, Hi-Lift jack, or the like.

Figure 3:
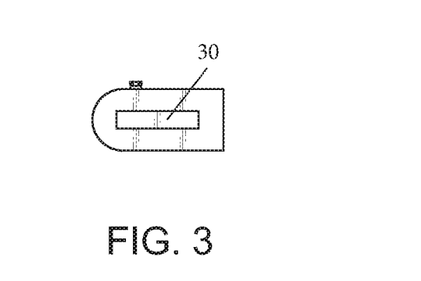
FIG. 3 shows an example of an embodiment of an end view of a car jack storage with a recessed handle on an end cap as may be understood in the various embodiments of the present invention.
Figure 4:
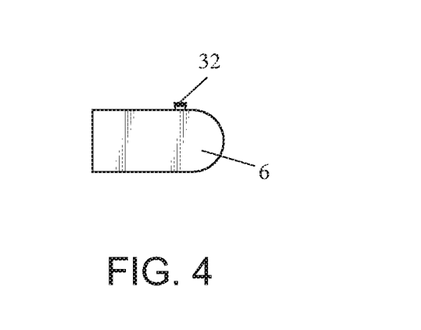
FIG. 4 shows an example of an embodiment of an end view of a car jack storage as may be understood in the various embodiments of the present invention.
Figure 5:
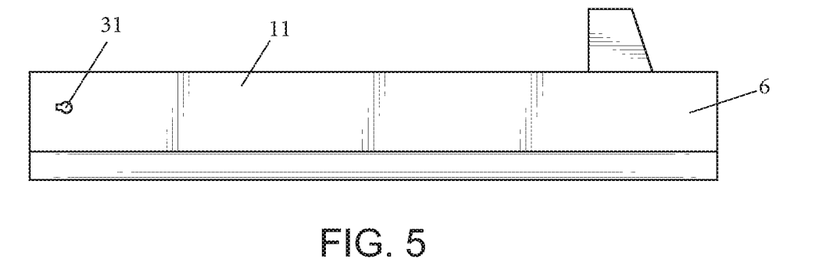
FIG. 5 shows an example of an embodiment of a top view of a closed car jack storage as may be understood in the various embodiments of the present invention.

As shown in FIG. 3, an end of a car jack storage may have a handle such as a recessed handle (30). A recessed handle may be located at the front end of a vehicle and may even be located next to a lock. Embodiments of the present invention may provide a storage which may be a lockable storage area perhaps for a jack. As shown in FIG. 5, a lock (31) may be included in a storage to allow locking of the storage. A lock (31) may be a heavy duty barrel lock such as with a barrel locking mechanism. A weather guard cap (32) may cover a lock, perhaps as shown in FIG. 4 which may be used to keep the inside of the storage clean from debris which may include water, moisture, dirt, sand, rain, or the like. Other ways to keep debris out of a car jack storage or any kind of storage may include a plastic caps, weather strip, seals, plugs, or the like.

Figure 6:
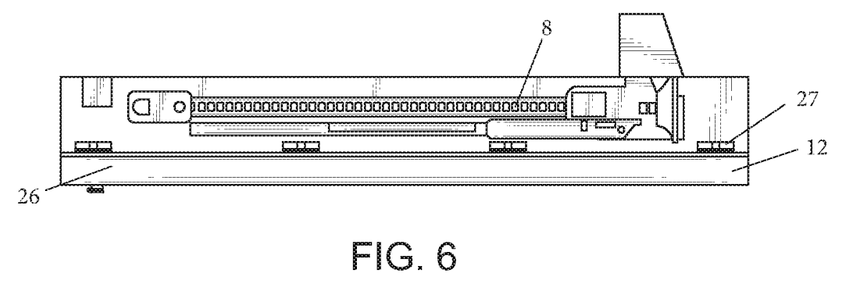
FIG. 6 shows an example of an embodiment of a top view of an opened car jack storage as may be understood in the various embodiments of the present invention.
Figure 7:
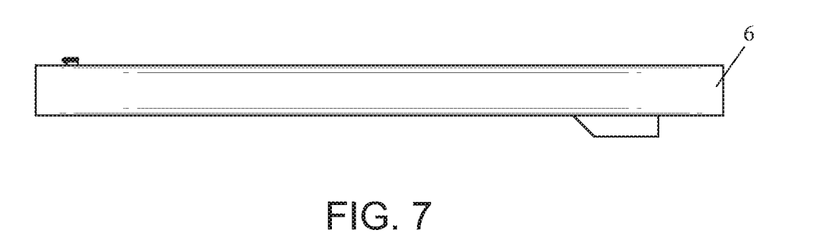
FIG. 7 shows an example of an embodiment of a side view of a car jack storage as may be understood in the various embodiments of the present invention.
Figure 17:
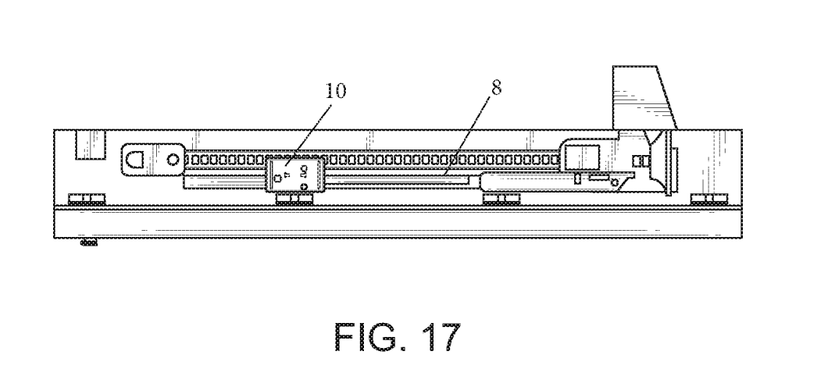
FIG. 17 shows an example of an embodiment of an opened car jack storage with a car jack therein as may be understood in the various embodiments of the present invention.
Figure 18:
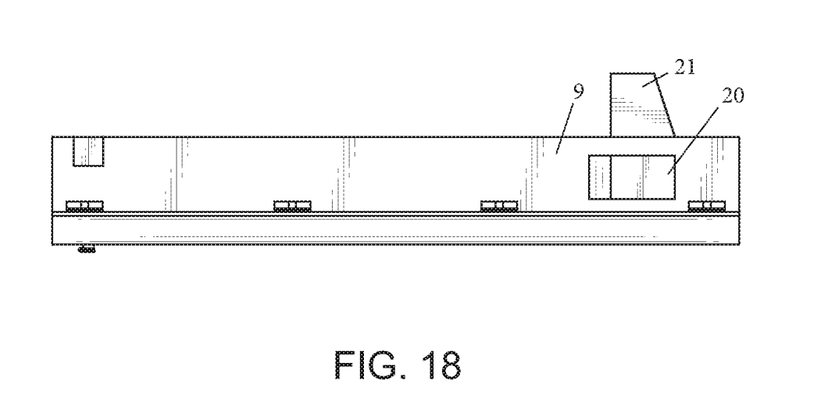
FIG. 18 shows an example of an embodiment of an opened car jack storage with a conforming compartment as may be understood in the various embodiments of the present invention.

As may be understood from FIGS. 6, 17, and 18, perhaps to provide a slim design and even a low profile, a car jack storage may have a conforming compartment (9) which may be designed to fit a car jack. A conforming compartment may have small basins such as a tray and boot perhaps on the lower and even the back side of a storage such as to conceal or even accommodate the bulky implements and even oversize base of a jack perhaps to keep the overall look clean and slim. Any number of basins may be provided such as but not limited to none, one, two, three, four, or the like. FIG. 18 shows an example of a how a car jack may fit into a recessed part (20) and even an extrusion part (21) of a conforming compartment (9) of a car jack storage. A jack may be fully enclosed perhaps to protect from any damage due to weather, theft, any 4×4 trail fun, or the like.

Figure 16:
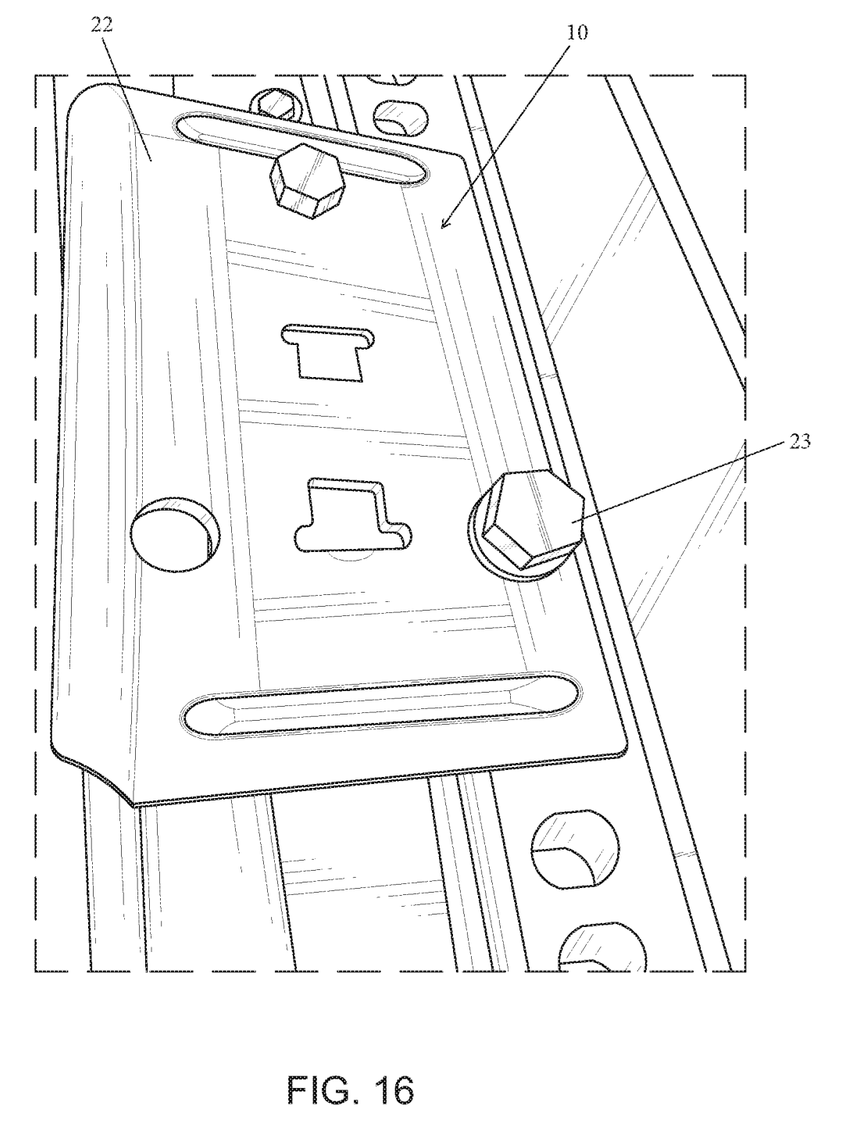
FIG. 16 shows an example of an embodiment of an attachment perhaps to secure a car jack in a storage as may be understood in the various embodiments of the present invention.

A car jack may be anchored in a car jack storage perhaps with an attachment (10) which may prevent it from moving and even rattling within the car jack storage. An attachment (10) may be considered a jack anchor attachment which may be capable of securing a car jack into said conforming compartment (9). As may be understood in FIGS. 16 and 17 an attachment (10) may include a movable plate (22) with a securement (23). An attachment may be a baseplate, perhaps from the car jack, that may be used with a securement perhaps as a cover. An attachment may be any kind of device that allows a car jack to be secured into a storage. A securement (23) may be a bolt, cotter pin, screw, pin, fastener, or the like.

In some embodiments, a closed car jack storage (11) may be a step to allow a user to step (40) on the closed car jack storage to enter and even exit a door of a vehicle. A vehicle may include, but is not limited to a 4×4 vehicle, a vehicle modified with a lift kit, a truck, two door vehicles, four door vehicles, a sport-utility vehicle, side by side recreational vehicles, jeeps, or the like.

A storage such as a car jack storage or any other kind of storage may be attached to a vehicle by at least one bracket. At least one bracket (2) may be mounted to a frame (3) of a vehicle (4). A bracket may be located near a door (5) (perhaps a driver's side door (25) or a passenger's side door, or any door of a vehicle). This may provide storage, a step, jack lift points, or the like near such door. For example, a bracket (2) may be attached such as by mounting to a frame under (7) at least part of a door (5) of a vehicle (4) as may be understood in FIG. 19.

Figure 11:
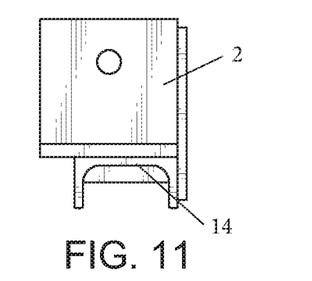
FIG. 11 shows an example of an embodiment of a bracket as may be understood in the various embodiments of the present invention.
Figure 12:
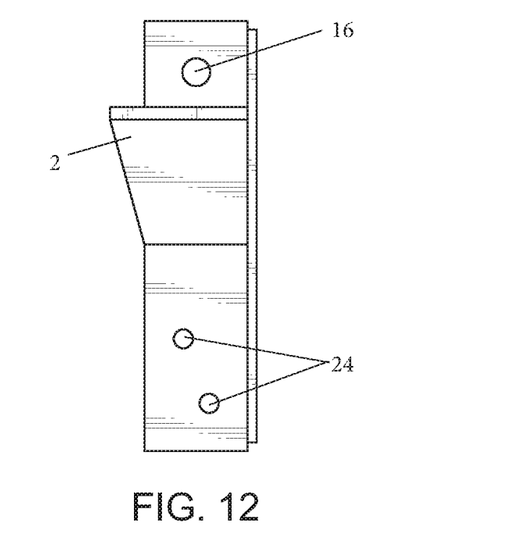
FIG. 12 shows an example of an embodiment of a bracket as may be understood in the various embodiments of the present invention.
Figure 13:
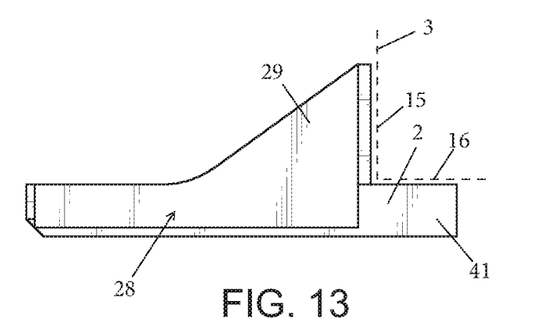
FIG. 13 shows an example of an embodiment of side view of a bracket as may be understood in the various embodiments of the present invention.
Figure 14:
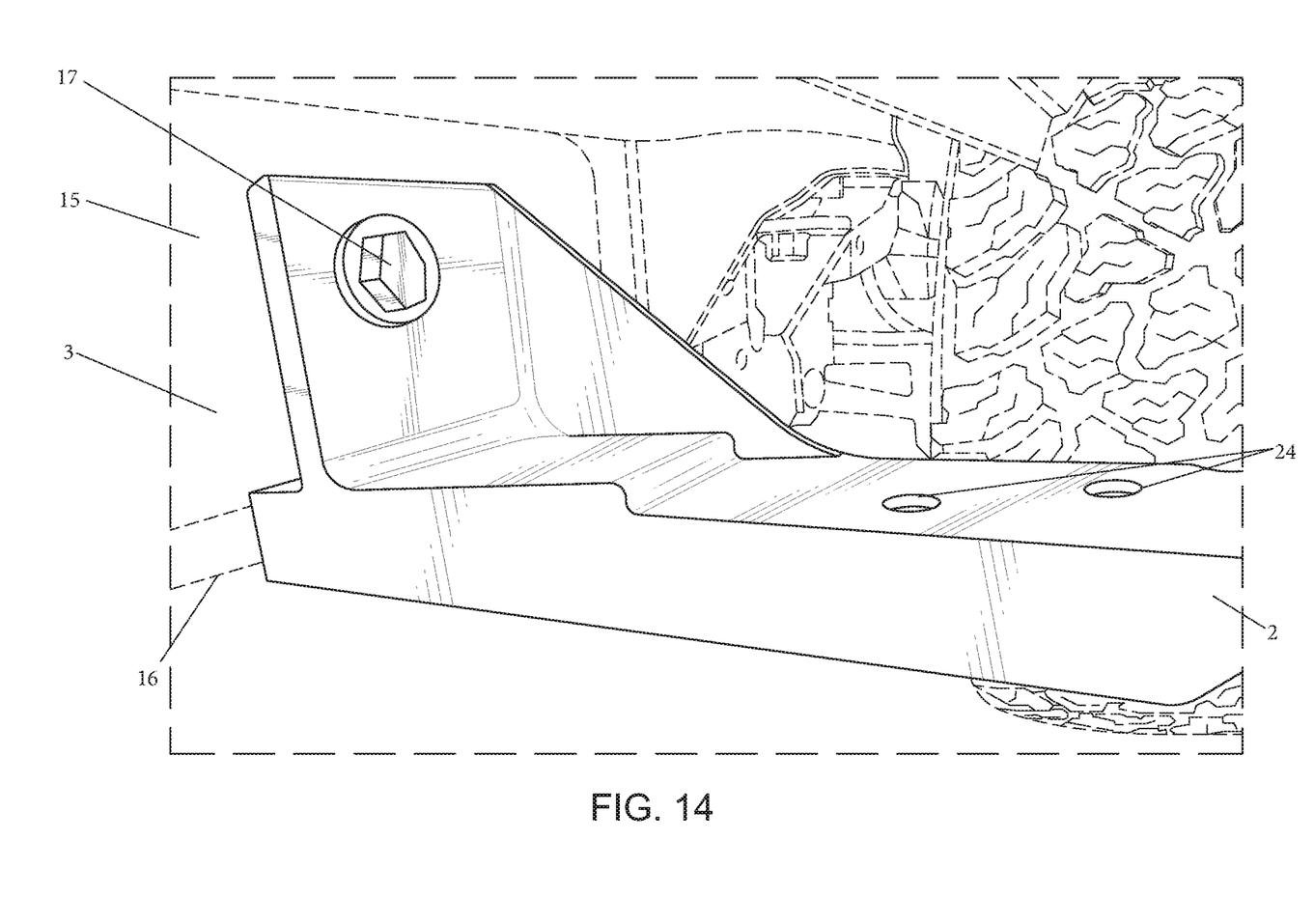
FIG. 14 shows an example of an embodiment of a bracket attached to a frame of a vehicle as may be understood in the various embodiments of the present invention.

As may be understood in FIGS. 11-13, a bracket (2) may be a T-shaped bracket (28) or may be a reinforced bracket with a plate gusset (29). A bracket may be fabricated out of about 3"4 lbs/ft. channel perhaps welded to about 4"×4"×⅜" angle iron and may be reinforced with about ¼" plate gusset. A bracket may be mounted directly to a frame perhaps by welding, fusing, or perhaps even with one, two or more attachments. As shown in FIG. 14, an attachment may be at least one bolt (17), a u-bolt, or the like. In some embodiments, a bracket may be mounted to a side (15) and even a bottom (16) of a frame perhaps in a mount position (41) so that a bracket may hug the side and bottom of the frame. Bolts, perhaps about 1" bolts, may be attached to a frame vertically and perhaps even horizontally. Of course, other attachments or mounting methods may be used in other embodiments. FIGS. 12 and 13 may show side (15) and bottom (16) frame mounting positions. Vertical bolts may be grade 8, about ¾" diameter ×about 7" long and horizontal bolts may be Grade 8, about ⅝" diameter ×about 4½" long.

In some embodiments, two brackets may be mounted to a frame which may be spaced apart to support each end of a storage. As may be understood in FIG. 15, one bracket may be mounted near a front (18) (perhaps a front frame) of a vehicle and the other bracket may be mounted near a back (19) (perhaps a back frame) of a vehicle. A bracket in a front may be located so that if the bracket is used as a jack lift (as explained herein), it may allow the front tire of a vehicle to be raised with the jack. A bracket in a back may be located so that if the bracket is used as a jack lift (as explained herein), it may allow the back tire of a vehicle to be raised with the jack.

Figure 15:
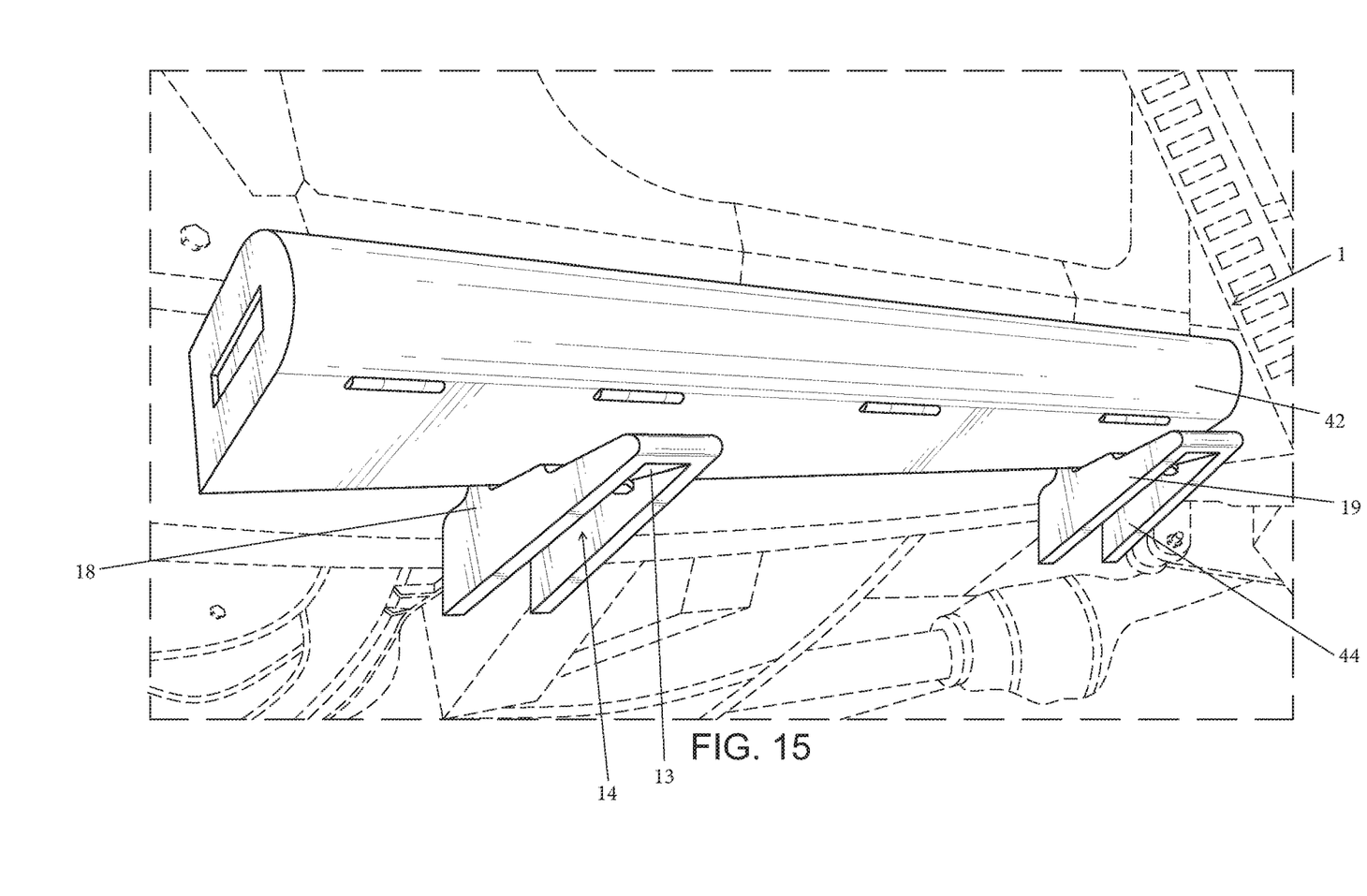
FIG. 15 shows an example of an embodiment of a bracket and storage attached to a frame of a vehicle as may be understood in the various embodiments of the present invention.
Figure 19:
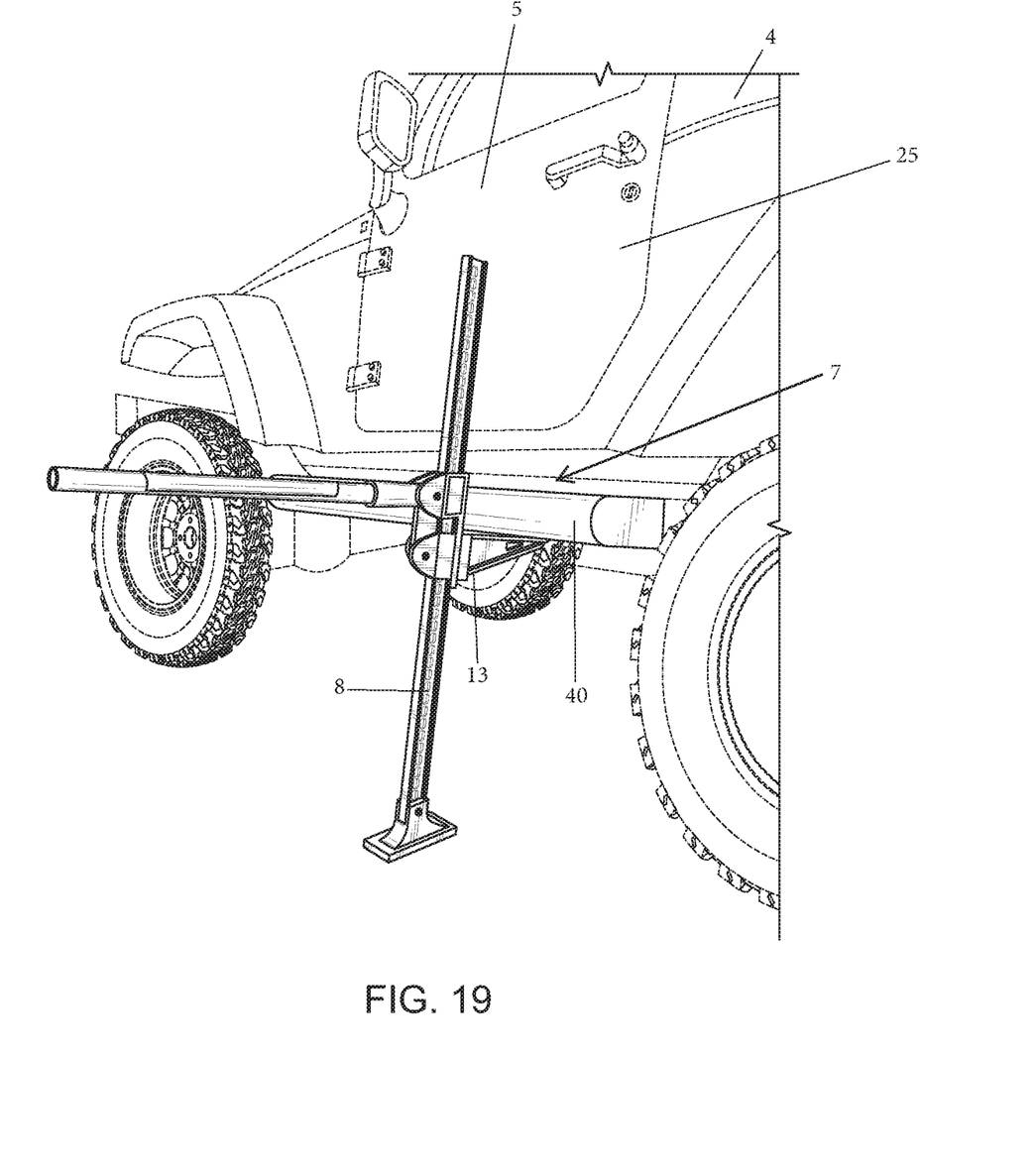
FIG. 19 shows an example of an embodiment of car jack in use with a bracket and storage attached to a vehicle as may be understood in the various embodiments of the present invention.

A bracket (2) may have a car jack lift point (13) which may provide a dedicated jack point as shown in FIGS. 15 and 19. A car jack lift point (13) may be capable of receiving the car jack to lift the vehicle and perhaps to provide a secure car jack lift point so that the jack may be secured with the bracket perhaps by not sliding off the bracket. A bracket may be mounted directly to a frame of a vehicle perhaps making it suitable to use a car jack at the lift points and to prevent damage to the vehicle perhaps to change a tire. Each side of a vehicle may have a jack point perhaps at the front and perhaps even the back of a storage perhaps so that you can lift any of the four wheels. A user may remove a car jack from an open car jack storage (12), may place the car jack under (14) the bracket perhaps at the car jack lift point, and may raise the vehicle with the car jack. The bracket may provide reinforcement of the vehicle lifting by the car jack as may be understood in FIG. 19.

Figure 8:
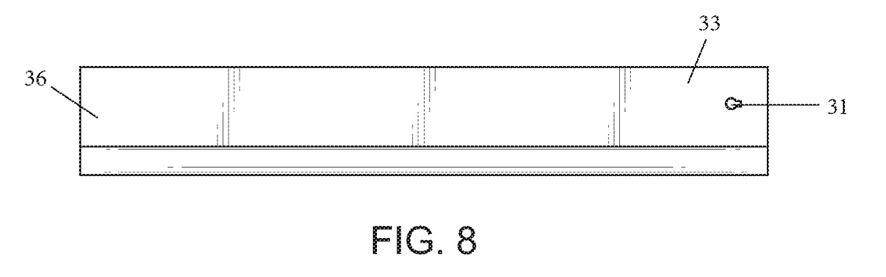
FIG. 8 shows a top view of an example of an embodiment of a closed storage as may be understood in the various embodiments of the present invention.
Figure 9:
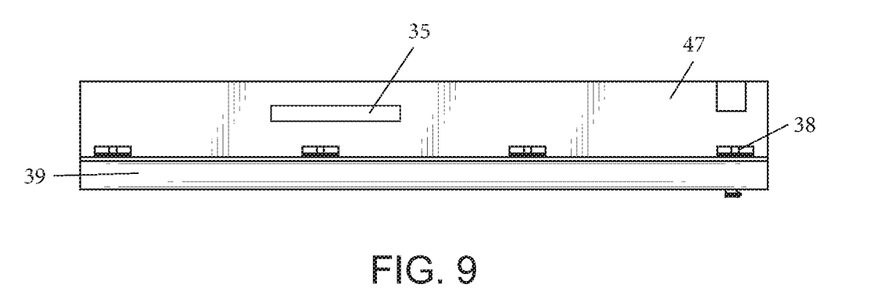
FIG. 9 shows a top view of an example of an embodiment of an opened storage as may be understood in the various embodiments of the present invention.
Figure 10:
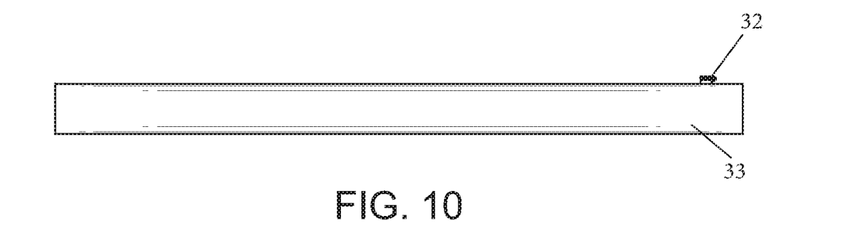
FIG. 10 shows an example of an embodiment of a side view of a storage as may be understood in the various embodiments of the present invention.

In embodiments, the present invention may provide a storage (33) which may be attached to a vehicle, non-limiting examples thereof are shown in FIGS. 8-10. A storage (33) may be an openable storage and may include a lock (31), storage for items (35), a hinge system (38), and even a clam shell door (39), or the like as discussed herein. A storage (33) may be in a closed position (36) to provide a closed storage which may then be used as step when mounted to a vehicle to enter and exit a door. A storage (33) may be used with a car jack storage, perhaps providing two storages for a vehicle, in that a storage may be mounted perhaps on a passenger's side of a vehicle. At least one additional bracket (44) may be mounted to a frame of a vehicle perhaps near a second door where a storage (33) may be attached to the additional bracket. The additional bracket may be mounted to a vehicle frame perhaps so that it and a storage may be located under at least part of a second door of a vehicle. A bracket may provide a car jack lift point and there may even be two or more brackets mounted to a frame, each as discussed herein.

The storage may store items (35) perhaps in an item storage compartment (47). A user may open a storage, place items in a storage, close a storage, and may even step on a closed storage as a step. Perhaps on a passenger side, a storage may store items (35) such as but not limited to chains, straps, tow straps, tools, or anything that needs to be secured, or the like. Of course, a storage (33) may be located on a driver's side of a vehicle or anywhere on a vehicle and a car jack storage may be located on a passenger's side of a vehicle or anywhere on a vehicle.

A storage (such as an openable storage or a car jack storage) may act as a debris guard (42) perhaps to protect damage to the vehicle. A debris guard may be a rock guard vehicle protector in that it may be strong enough to protect a vehicle from rocks or other debris. A storage made of a material that may be durable enough to protect the body of a vehicle perhaps during four wheeling such as but not limited to steel, heavy diamond plate steel, perhaps about ¼" checker diamond plate steel, may be mounted to the frame with about 3" 4 lbs channel welded to about 4"×4" ⅜" angle iron, and may be reinforced with about ¼" plate gusset. Of course, in other embodiments, other sizes and materials may be used. Attaching a storage to a frame rather than a body of a vehicle may provide additional protection perhaps from objects hitting the body of the truck and that may cause damage.

Embodiments of the present invention may provide a slim, low profile storage/running board which may be located below the driver and even passenger door that may provide secured and even out of sight storage for a jack such as a handyman jack. By placing the jack in an attachable storage, a user may no longer need to mount a jack exposed on the outside of the vehicle. A storage may be designed to be sleek and may blend in with the wheel flares so that it may look to be just a running board.

As can be easily understood from the foregoing, the basic concepts of the present invention may be embodied in a variety of ways. It involves both multi-functioning attachable vehicle storage techniques as well as devices to accomplish the appropriate multi-functioning attachable vehicle storage. In this application, the multi-functioning attachable vehicle storage techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "storage" should be understood to encompass disclosure of the act of "storing"—whether explicitly discussed or not—and, conversely, were there effectively disclosure of the act of "storing", such a disclosure should be understood to encompass disclosure of a "storage" and even a "means for storing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of references or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the running board devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for using a vehicle appendage comprising the steps of:
    mounting at least one bracket to a frame of a vehicle, wherein said bracket is located near a door of said vehicle;
    attaching a car jack storage to said bracket mounted to said vehicle frame, wherein said car jack storage is located under at least part of said door of said vehicle;
    opening said car jack storage;
    placing a car jack in a conforming compartment of said car jack storage mounted to said vehicle frame;
    anchoring said car jack in said car jack storage with an attachment;
    storing said car jack in said car jack storage mounted to said vehicle frame;
    closing said car jack storage;
    stepping on said closed car jack storage to enter and exit said door of said vehicle;
    removing said car jack from an open car jack storage;
    providing a car jack lift point with said at least one bracket;
    placing said car jack under said at least one bracket;
    reinforcing vehicle lifting by said car jack with said at least one bracket; and
    raising said vehicle with said car jack.

2. The method as described in claim 1 wherein said step of mounting said at least one bracket to said frame of said vehicle comprises the step of mounting said at least one bracket to a side and a bottom of said frame of said vehicle.

3. The method as described in claim 1 wherein said step of mounting said at least one bracket to said frame of said vehicle comprises the step of mounting said at least one bracket to said frame of said vehicle with a u-bolt.

4. The method as described in claim 1 wherein said step of mounting said at least one bracket to said frame of said vehicle comprises the step of mounting said two brackets to said frame of said vehicle.

5. The method as described in claim 1 and further comprising the step of mounting one of said two brackets near a front of said vehicle and mounting the other of said two brackets near a back of said vehicle.

6. The method as described in claim 1 wherein said step of placing said car jack in said conforming compartment of said car jack storage mounted to said vehicle frame comprises the step of fitting said car jack into a recessed part and an extrusion part of said conforming compartment of said car jack storage.

7. The method as described in claim 1 wherein said car jack is selected from a group consisting of a handyman jack and a non-factory provided car jack.

8. The method as described in claim 1 wherein said attachment comprises a movable plate with a securement.

9. The method as described in claim 1 and further comprising the step of preventing damage to said vehicle with said mounted car jack storage.

10. The method as described in claim 1 wherein said car jack storage comprises a rock guard vehicle protector.

11. The method as described in claim 1 and further comprising securing said jack with said car jack lift point under of said bracket.

12. The method as described in claim 1 wherein said car jack lift points prevent damage from said car jack to said vehicle.

13. The method as described in claim 1 wherein said car jack storage comprises a clam shell door.

14. The method as described in claim 1 wherein said bracket comprises a T-shaped bracket.

15. The method as described in claim 1 wherein said bracket comprises a reinforced bracket with a plate gusset.

16. The method as described in claim 1 and further comprising the steps of:

mounting at least one additional bracket to said vehicle frame of said vehicle, wherein said at least one additional bracket is located near a second door of said vehicle;

attaching a storage to said at least one additional bracket mounted to said vehicle frame, wherein said storage is located under at least part of said second door of said vehicle;

opening said storage;

placing items in said storage mounted to said vehicle frame;

storing said items in said storage mounted to said vehicle frame;

closing said storage; and stepping on said closed storage to enter and exit said second door of said vehicle.

17. The method as described in claim 16 wherein said at least one additional bracket comprises two additional brackets and further comprising the step of mounting one of said two brackets near a front of said vehicle and mounting another of said two brackets near a back of said vehicle.

18. The method as described in claim 16 wherein said items are selected from a group consisting of chains, straps, tow straps, and tools.

19. A vehicle appendage comprising:

at least one bracket configured and arranged to be mounted to a frame of a vehicle and mounted near a door of said vehicle;

an openable car jack storage configured and arranged to attach to said at least one bracket and to be located under at least part of said door of said vehicle;

a conforming compartment in said openable car jack storage configured and arranged to receive a car jack; and a jack anchor attachment configured and arranged to secure said car jack into said conforming compartment;

wherein said openable car jack storage when in a closed position comprises a step for said vehicle;

wherein said at least one bracket comprises a car jack lift point configured and arranged to receive said car jack for vehicle lifting.

* * * * *